United States Patent [19]

Mazzafro et al.

[11] Patent Number: 5,275,701
[45] Date of Patent: Jan. 4, 1994

[54] PROCESS FOR PURIFICATION AND CONCENTRATION OF SULFURIC ACID

[75] Inventors: William J. Mazzafro, Schnecksville; Stephen I. Clarke, Macungie; Philip N. Taylor, Bethlehem, all of Pa.

[73] Assignee: Air Products and Chemicals, Inc., Allentown, Pa.

[21] Appl. No.: 33,653

[22] Filed: Mar. 15, 1993

[51] Int. Cl.$^5$ .......................... B01D 1/26; C01B 17/90
[52] U.S. Cl. ..................... 203/12; 159/17.1; 159/47.1; 159/DIG. 8; 159/DIG. 42; 202/174; 202/176; 203/22; 203/49; 203/73; 203/95; 203/DIG. 8; 423/522; 423/526; 423/531
[58] Field of Search ............. 203/12, 73, 49, 95, 203/22, 23, DIG. 159; 47.1; 208.13; 423, 531, 522, 525, 526, 202, 174, 176, 205, 235, 269; 208/13;

[56] References Cited

U.S. PATENT DOCUMENTS

| | | | |
|---|---|---|---|
| 1,969,793 | 8/1934 | Hechenbleikner | 203/12 |
| 2,414,727 | 1/1947 | Ellender | 423/526 |
| 3,856,673 | 12/1974 | De La Mater et al. | |
| 3,972,987 | 8/1976 | von Plessen et al. | |
| 3,979,465 | 9/1976 | Strehlke et al. | 423/531 |
| 4,138,309 | 2/1979 | Kuhnlein et al. | 203/12 |
| 4,155,989 | 5/1979 | Miller | |
| 4,157,381 | 6/1979 | Bodenbenner et al. | |
| 4,276,116 | 6/1981 | Blumrich et al. | 423/531 |
| 4,409,064 | 10/1983 | Vora et al. | |
| 5,061,472 | 10/1991 | Lailach et al. | 423/531 |

FOREIGN PATENT DOCUMENTS

| | | | |
|---|---|---|---|
| 0030605 | 12/1969 | Japan | 423/531 |
| 0512907 | 9/1939 | United Kingdom | 423/531 |
| 0528696 | 11/1940 | United Kingdom | 423/531 |

Primary Examiner—Virginia Manoharan
Attorney, Agent, or Firm—Russell L. Brewer; James C. Simmones; William F. Marsh

[57] ABSTRACT

A process for the purification and concentration of sulfuric acid contained with nitric acid by-products and organic components pursuant to the mixed acid nitration of aromatics. The process resides in the integration of a purification system with a concentration system which includes:

heat exchanging spent sulfuric acid feedstock in indirect heat exchange with hot, concentrated sulfuric acid obtained from the sulfuric acid concentration system prior to introduction to said purification system;

introducing the hot sulfuric acid into an upper portion of a purification system including a stripping column wherein organic contaminants and nitrogen-containing by-products are removed by countercurrent contact with superheated steam or hot gases;

removing a contaminant-free sulfuric acid stream from a lower portion of said stripping column and introducing said contaminant-free sulfuric acid to the first stage of a sulfuric acid concentration system including a multiple effect vacuum concentration system;

establishing a pressure differential between the removal point for the contaminant-free sulfuric acid from the stripping column and the entry point for the sulfuric acid concentration system including a multiple effect evaporator system such that the pressure differential is sufficient to provide flow from said stripping column to the multiple effect evaporator system without external pumps.

6 Claims, 1 Drawing Sheet

PROCESS FOR PURIFICATION AND CONCENTRATION OF SULFURIC ACID

FIELD OF THE INVENTION

This invention relates to a process for the purification of spent sulfuric acid obtained from the manufacture of nitroaromatic compositions by the mixed acid process and to the concentration thereof for reuse.

BACKGROUND OF THE INVENTION

In the mixed acid nitration of aromatic compounds, such as toluene, a mixture of concentrated nitric acid and concentrated sulfuric acid is contacted with an aromatic compound under reaction conditions such that nitroaromatic products including mono and dinitrobenzene and mono and dinitrotoluene are produced. In the mixed acid nitration, water and/or dilute sulfuric acid are generated as by-products. The bulk aqueous phase of spent acid is readily separated from the bulk organic phase comprising nitroaromatic and organic by-products by decantation. Prior to reuse, residual contamination of the sulfuric acid by nitric acid, nitrous acid, unreacted aromatic and organic reaction by-products is removed and the dilute sulfuric acid, as low as 65% by weight, is concentrated to as high as 95% by weight.

In one commercial process for purification and concentration of spent sulfuric acid, the sulfuric acid is recovered by decantation from the organic phase, heated and introduced to the top of a packed column for effecting denitrification. Steam is introduced to a bottom portion of the sulfuric acid denitrification column and nitric acid and derivatives are stripped therefrom. The denitrified sulfuric acid is removed from the bottom portion of the sulfuric acid denitrification column and heat exchanged against incoming feed to the column prior to storage. Sulfuric acid after denitrification then is heated and concentrated in a series of multiple effect evaporators.

Representative patents which describe various aspects of purification and concentration of sulfuric acid obtained as a spent acid from the mixed acid nitration of aromatic compounds are as follows:

U.S. Pat. No. 3,856,673 discloses a process for purifying spent acid obtained from the nitration of aromatic hydrocarbons with particular emphasis towards removing organic impurities contained therein. The patent describes in its prior art section a conventional method for removing impurities which comprised heating the spent sulfuric acid to its boiling point and stripping the acid with hot gases such as steam, air or nitrogen. The improved purification process set forth in the patent resided in admixing the sulfuric acid stream with an oxidizing agent selected from the group consisting of ozone, hydrogen peroxide, peroxydisulfates, and chlorates.

U.S. Pat. No. 4,157,381 discloses a process for the regeneration of dilute sulfuric acid containing organic impurities, and possibly inorganic salts, in a three-step process. In the first step, dilute sulfuric acid is heated in indirect heat exchange with vapor from a second step and directly heat exchanged with steam in the second step. Acid as it leaves the first step is contacted with a countercurrent flow of a mixture of steam and acid vapor and acid leaving the second step is contacted with superheated steam in direct heat exchange and the regenerated acid separated with the remaining mixture of steam and acid recycled to the second step. An oxidant is added in at least one of the steps to oxidize organic components.

U.S. Pat. No. 4,409,064 discloses a process for the concentration of sulfuric acid obtained as a spent acid from the mixed acid nitration of aromatic compounds. The patent describes equipment modifications in the form of mist elimination pads in a series of multiple effect evaporators to reduce carry over of entrained droplets in the overhead from these evaporators.

U.S. Pat. No. 4,155,989 discloses a process for the denitrification of spent sulfuric acid obtained as a byproduct from various nitration processes. Sulfur dioxide is added to the spent nitration acid in sufficient amount to convert to nitric acid contained therein to volatile nitrogen oxides, vaporized nitrogen oxides are removed.

U.S. Pat. No. 3,972,987 discloses a process for the regeneration of sulfuric acid containing organic substances and mineral salts. The process comprises distilling the impure water-containing sulfuric acid in vacuo, drawing off a bottom product from the distillation and concentrating the condensate in a Pauling installation. In the Pauling process, sulfuric acid is passed through a dephlegmator mounted on a vessel. Hot vapors rising from the boiling contents of the vessel are stripped by cooled dilute acid flowing downwardly. To aid in decomposition of inorganic impurities, an oxidant is added to the process.

SUMMARY OF THE INVENTION

This invention relates to an improved process for the purification and concentration of spent sulfuric acid containing nitric acid, nitrous acid and residual organic impurities obtained as byproduct from the mixed acid nitration of aromatic compounds. In this process, the purification or denitrification step and concentration steps are combined and this is accomplished by heating spent sulfuric acid containing such residual nitric acid, nitrous acid, and organic impurities to a temperature at or close to the boiling point, introducing the heated sulfuric acid to an upper portion of a purification system comprising a stripping column and contacting said sulfuric acid with a stripping gas, thereby generating an overhead rich in organic and nitric acid components and a bottoms fraction consisting of a purified sulfuric acid. The purified sulfuric acid in the bottom fraction then is introduced to a sulfuric acid concentration system comprising a series of multiple effect evaporators under subatmospheric conditions for effecting removal of water therefrom and thereby concentrating the sulfuric acid. An aspect of the improvement is that at least a portion of the concentrated sulfuric acid product from the evaporation is indirectly heat exchanged with incoming spent sulfuric acid feedstock to the stripping column. The sulfuric acid product is recovered for reuse in the mixed acid nitration process. Further, the stripping column and multiple effect evaporation are strategically married for providing a sufficient head or pressure differential to permit flow from the stripping column to the evaporator system without pumping means.

There are several significant advantages associated with this process for effecting purification concentration of spent sulfuric acid and these include:

an ability to reduce the number of steps associated with the purification and recovery of spent sulfuric acid relative to the prior art processes;

an ability to conserve energy associated with purification and concentration of spent sulfuric acid vis-a-vis the prior art processes;

an ability to eliminate expensive heat exchange, pumping and storage equipment including piping via strategic placement of the process equipment;

an ability to utilize less costly materials of construction due to low temperature, vacuum concentration of dilute acid;

an ability to recover and return residual organics to the nitration process, thus enhancing yield; and, an ability to recover residual nitric acid and nitrogen oxides ($NO_x$) as nitric acid by the application of additional equipment for the return of nitric acid to the mixed acid nitration process, thus enhancing yield.

DETAILED DESCRIPTION OF THE INVENTION

Figure 1:
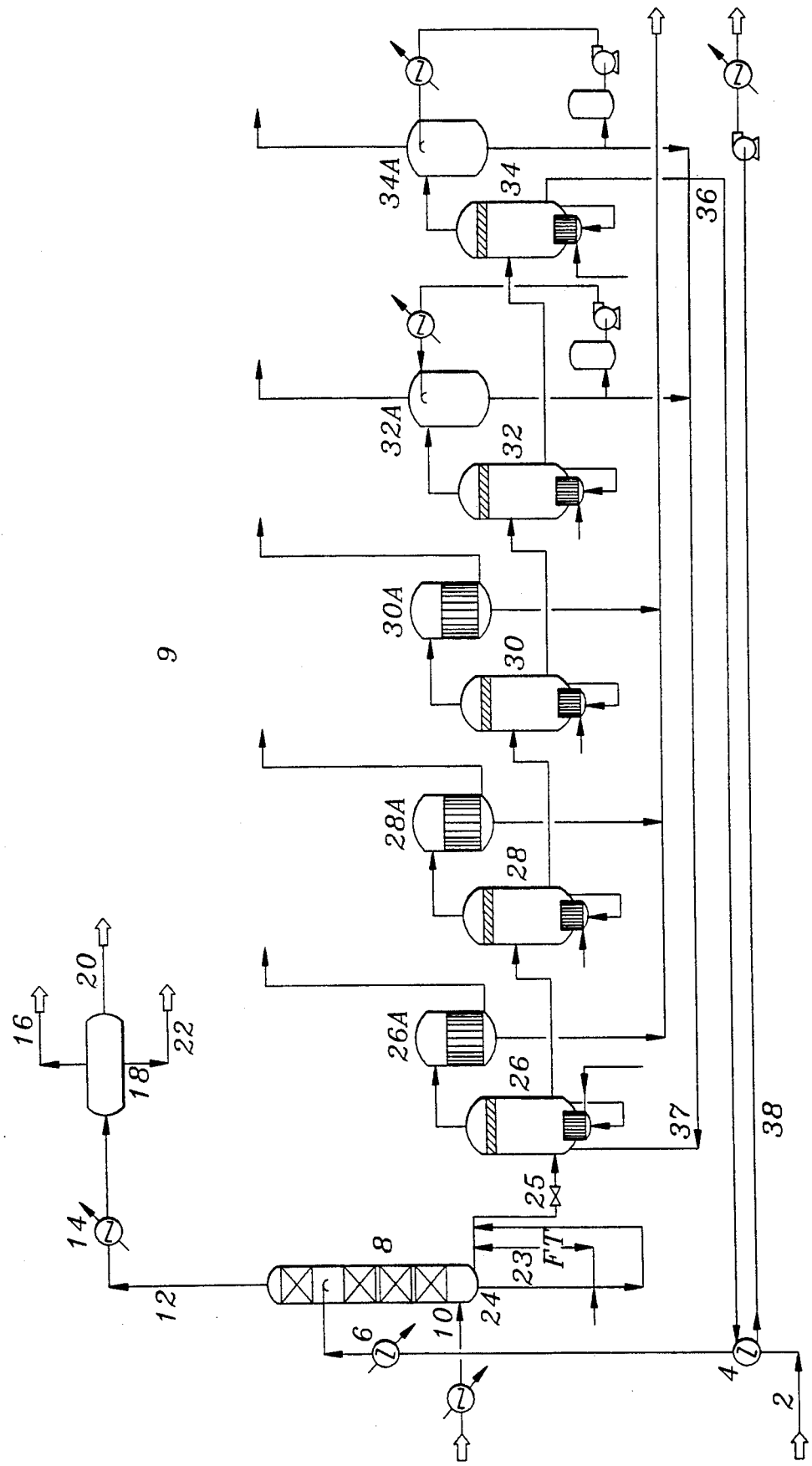
FIG. 1 is a process flow diagram showing the purification and concentration steps associated with the recovery of spent acid obtained as a byproduct from the mixed acid nitration of aromatic compounds, e.g. toluene.

Dilute sulfuric acid obtained from the mixed acid nitration of organic aromatics such as toluene to produce both mono and dinitrated aromatics will typically will have a concentration of 65 to 75% by weight sulfuric acid and be contaminated with small amounts of inorganic components such as nitric acid, nitrous acid and organic byproducts of the mixed acid nitration such as nitrated cresols and phenols. The dilute sulfuric acid with impurities is fed via line 2 to heat exchanger 4 wherein it is heated in indirect heat exchange with product sulfuric acid obtained from a later stage in the process. The temperature of the dilute sulfuric acid leaving heat exchanger 4 will be determined by the design temperature approach of heat exchanger 4, typically set by economic criteria, and the concentration of product sulfuric acid leaving evaporator 34. The dilute sulfuric acid is further heated in preheater 6 to a temperature at or close to its boiling point, typically within about 50° F. of the boiling point. Due to the corrosive nature of the sulfuric acid, heat exchangers 4 and 6 typically are constructed of tantalum or lined with glass or polytetrafluoroethylene.

Purification, including denitrification and organic contaminant removal, is effected in a purification system comprising stripping column 8. The hot, dilute sulfuric acid from heat exchangers 4 and 6 is introduced into an upper portion of the column and allowed to pass over vapor/liquid contact enhancing media such as packing. Superheated steam is introduced via line 10 to a lower portion of stripping column 8 and is passed countercurrent to the downward flowing, hot, dilute sulfuric acid. Other gases may be used in place of steam for stripping and these include air and nitrogen, although superheated steam is preferred. The organic contaminants and nitrogen oxide by-products, such as residual nitric acid, nitric oxide, etc., are removed as an overhead from stripping column 8 via line 12, and cooled in condenser 14. Volatile components are vented to a stack or to an environmental treatment system via line 16. The condensate is phase separated in phase separator 18 wherein the aqueous phase is removed via line 20 and the organic contaminants are removed as a bottoms via line 22.

A hot (320°–360° F.) dilute sulfuric acid is removed as a bottoms fraction from stripping column 8 via line 24 wherein it is then introduced to a sulfuric acid concentration system 9 comprising a series of multiple effect evaporators 26, 28, 30, 32 and 34 operating at subatmospheric pressure. A flow restrictor 25 is placed in line 24 to mimimize flashing of the hot, sulfuric acid prior to entering sulfuric acid concentration system 9. The purification system comprising stripping column 8 is strategically located with respect to sulfuric acid concentration system 9 comprising a series of multiple effect evaporators such that feed is transported to the sulfuric acid concentration system without the need for temperature reduction and/or pumps. To accomplish this a pressure differential is maintained between stripping column 8 and evaporator 26. This pressure differential should be sufficient to drive the purified acid from stripping column 8 into the sulfuric acid concentration system 9. One method for generating this pressure differential or head is to elevate stripping column 8 and/or elevation of line 24 with respect to the introduction point to the first stage of the multiple effect evaporator system. The elevation of stripping column 8, along with the elevation of line 24, establishes a higher than normal liquid level or head in stripping column 8 and drives the passage of dilute sulfuric acid to the first stage of the multiple effect evaporator system in the sulfuric acid concentration system without the need for pumps. A second method for establishing such pressure differential, and aiding in the transfer of the sulfuric acid from the stripping column to the sulfuric and concentration system 9, is through the utilization of vacuum from the evaporators comprised in sulfuric acid concentration system 9. A third method for establishing a liquid head between the stripping column and evaporator section is through pressurization of the stripping column. However, that method is not preferred because it creates a temperature rise in the stripping column and condenser. Preferably a combination of liquid head and evaporator vacuum would be used to generate the necessary pressure differential to drive sulfuric acid from the stripper to the evaporators. A seal loop in line 24 is used to maintain a liquid seal between the stripper column 8 and evaporator 26 thus ensuring that steam feed 10 to the stripper column is not bypassed to the evaporator. The minimum height of this seal, that is the distance from the top of the loop down to the minimum desired operating level of acid in the stripper column, is set by the pressure difference between stripping column 8 and the first evaporator in the sulfuric acid concentration system 9. Typically, this is expressed in liquid head of acid. To prevent the hot acid from flashing prior to entering the first evaporator, a flow restrictor 25 is preferably and strategically placed downstream of the seal loop, preferably at the entry point to the first evaporator such that flashing occurs across the flow restrictor 25 upon entry into the evaporator. The flow restriction, which can take the form of a valve, orifice or reduced line or nozzle size, provides sufficient backpressure to prevent significant flashing of the acid into two phases.

Concentration of sulfuric acid via a multiple effect evaporator system is carried out in accordance with conventional methods such as those described in U.S. Pat. No. 4,409,064; such system is incorporated by reference. The multiple effect evaporator system shown comprises five evaporators 26, 28, 30, 32 and 34 coupled to overhead condensers 26a, 28a, 30a, 32a and 34a for the prevention of contaminating substances exiting as vapor from the evaporators. Dilute sulfuric acid will be concentrated from an initial concentration of 65 to 75% to a concentration necessary for nitration, typically ranging from 80% to about 95% and preferably 93% if it is to be used for a mixed acid nitration of aromatic compounds. In an effort to minimize evaporation temperature, the evaporators are operated at subatmospheric pressure, e.g. from an initial pressure of about 100 mm Hg to a pressure of about 10 mm Hg in the final stage. Temperatures typically range from an initial temperature of approximately 260° F. to a final temperature of around 325° F. Higher temperature may be used but due to the corrosive nature of sulfuric acid, such temperatures are to be avoided.

More specifically, the multiple effect evaporator system consists of evaporators 26, 28, 30, 32, and 34. Each is equipped with an overhead condenser 26a, 28a, 30a, 32a and 34a. Vapor from each evaporator is charged to the condenser and volatiles removed as an overhead and passed to the vacuum system. A portion of the bottom fraction in each evaporator is conveyed to the next evaporator in the series for increased concentration. In final evaporator 34, the bottoms fraction is withdrawn via line 36 and is heat exchanged with incoming sulfuric acid feed in heat exchanger 4. The cooled product sulfuric acid at 80-95% concentration is removed via line 38 then cooled further (means not shown) and charged to a storage tank and held for reuse. Condensate from initial condensers 26a, 28a and 30a is removed for environmental discard. Condensate from final direct contact condensers 32a and 34a is returned via line 37 to first evaporator 26.

What is claimed is:

1. In a process for the purification and concentration of spent sulfuric acid obtained from a mixed acid nitration of aromatic compounds wherein organic contaminants and nitrogen containing by-products contained in the spent sulfuric acid are removed in a purification system and then the contaminant-free sulfuric acid concentrated in a sulfuric acid concentration system the improvement residing in the integration of the purification system with a concentration system which comprises:

heat exchanging spent sulfuric acid feedstock in indirect heat exchange with heated, concentrated sulfuric acid obtained from the sulfuric acid concentration system prior to introduction to said purification system;

introducing the preheated hot sulfuric acid feedstock into an upper portion of a purification system comprising a stripping column wherein organic contaminants and nitrogen-containing by-products are removed by countercurrent contact with superheated steam or heated gases;

removing a contaminant-free sulfuric acid stream from a lower portion of said stripping column and introducing said contaminant-free sulfuric acid to a first stage of a sulfuric acid concentration system comprising a multiple effect vacuum concentration system;

establishing a pressure differential between the removal point for the contaminant-free sulfuric acid from the stripping column and the entry point to the first stage of said sulfuric acid system comprising a multiple effect evaporator system such that the pressure differential is sufficient to provide flow from said stripping column to the multiple effect evaporator system without external pumps.

2. The process of claim 1 wherein the pressure differential is achieved by means selected from the group consisting of an elevation difference between the stripping column and the multiple effect vacuum concentration system, vacuum from the multiple effect vacuum concentration system and elevated operating pressure in the stripping column.

3. The process of claim 2 wherein flow restriction is provided between the sulfuric acid removal point of the stripping column and the introduction point to the multiple effect vacuum concentration system, thereby reducing flashing of sulfuric acid prior to entry to the multiple effect vacuum concentration system.

4. The process of claim 2 wherein a seal loop is established between the stripping column and multiple effect vacuum concentration system such that steam from the stripper does not bypass into the multiple effect concentration system.

5. The process of claim 1 wherein superheated steam or heated gases comprising air or inert gas are used either separately or in combination to strip the organic contaminants and nitrogen-containing by-products from the dilute sulfuric acid.

6. The process of claim 1 wherein the organic contaminants and nitrogen-containing by-products are recovered and returned to the mixed acid nitration process thus increasing nitration process yields.

* * * * *